Patented Oct. 8, 1946

2,408,983

UNITED STATES PATENT OFFICE 2,408,983

COMPOSITION OF MATTER SUITABLE AS A HYDRAULIC FLUID

Myron H. Kollen, Detroit, Mich., assignor to Union Oil Company of California, Los Angeles, Calif., a corporation of California No Drawing. Application January 25, 1943, Serial No. 473,543

21 Claims. (Cl. 252—73)

This invention relates to the production of a composition of matter suitable as a hydraulic fluid and for certain lubricating oil purposes.

Hydraulic fluids are used in many mechanical devices as a means of transmitting power. In many instances the character of the fluid employed is not particularly important providing it has the ability to flow, provide the necessary amount of lubrication to prevent metal to metal contact between operating parts of the hydraulic system and to remain reasonably stable during its period of use. Recent developments in the aircraft industry, particularly the development of aircraft for substratospheric flying, has necessitated the use of hydraulic fluids having extremely high viscosity indices and extremely low pour points, i. e., oils which are not greatly affected by the low temperatures such as are encountered in this type of service. Moreover, hydraulic systems used in airplanes, in order to conserve weight, must be constructed with oil lines having relatively small diameters. Oils to be used in hydraulic systems and particularly in airplane hydraulic systems must therefore have a viscosity great enough to prevent leakage at ordinary atmospheric temperatures and yet low enough to allow flow at temperatures as low as about −80° F. They must not contain waxes or other materials which tend to crystallize in the oil at these lower temperatures, they must possess adequate lubricating properties, they must not have injurious effects upon parts present in the hydraulic system and they must be free from any tendency to form acids or objectionable deposits or sludges during use or while in storage.

Many hydraulic fluids now in use are produced from petroleum products. Some of these fluids are made by the redistillation of petroleum spray oils to produce a material having the desired viscosity and then subsequently refined to produce a fluid having a desirable pour point, viscosity-temperature susceptibility or viscosity index, flash point and low viscosity gravity constant. The latter characteristic has been considered as a measure of the swelling effect of an oil on natural or synthetic rubber which are usually contained in hydraulic systems.

It is the object of the present invention to prepare a fluid compound which is highly suitable for hydraulic systems. It is a particular object to provide a fluid compound which is particularly adapted to be used in systems operated under extreme temperature conditions, i. e., subjected to a wide temperature range and which at the lowest temperatures of this range is still in the form of a fluid. Such an oil may be described as having a high viscosity index. It is a further object of this invention to produce a compounded fluid having a low viscosity gravity constant, a very low pour point and a relatively high flash point.

The base material which I employ in my new composition of matter consists essentially of isoparaffinic hydrocarbons having a boiling range between approximately 400 and 700° F. Such a material may be produced by reacting olefins with isoparaffins under the influence of heat and pressure, as described in the article appearing in Industrial and Engineering Chemistry, 1936, volume 28, page 1439. This base material also may be produced by reacting olefins and isoparaffins in the presence of a catalyst. For example, low boiling or normally gaseous olefins, such as the butenes and pentenes may be reacted with an isoparaffin such as isobutane in the presence of a catalyst such as concentrated sulfuric acid, a mixture of concentrated phosphoric acid and sulfuric acid, chlorosulfonic acid, aluminum chloride or hydrogen fluoride.

The following method may be used for the production of the high boiling isoparaffinic hydrocarbon compounds used as a base material in my new composition of matter.

Into a vessel equipped with an agitating device there is introduced 5 parts of a low boiling isoparaffin, such as isobutane. Into the same vessel there is also introduced 5 parts of concentrated sulfuric acid containing about 98% $H_2SO_4$. While agitating the sulfuric acid and low boiling isoparaffin in the agitator at a temperature of about 60° F. there is added slowly 1 part of an olefin mixture consisting essentially of butenes and pentenes. After thorough agitation of the mixture of sulfuric acid, isoparaffins and olefins for a period of 3 hours the mixture is allowed to settle and the hydrocarbon phase is separated by decantation from the acid phase. The hydrocarbon phase is placed in a still and all of the materials contained in this phase boiling up to about 400–500° F. are removed leaving a relatively high boiling bottoms having a boiling range of approximately 400–500 to about 700° F., depending upon the distillation end point of the alkylation product and having also the desired viscosity and flash point. The preparation of high boiling materials produced by the alkylation reaction between the olefins and isoparaffins is materially influenced by the nature of the stocks and the temperature employed, a temperature somewhat lower than 60° F. often favors the production of high boiling isoparaffinic materials.

In a typical distillation of the alkylation product which was stopped so as to produce a bottoms material having a Saybolt Universal viscosity of approximately 50 seconds at 100° F. the resulting bottoms had the following characteristics:

| | |
|---|---:|
| Boiling range, °F | 450–700 |
| Gravity, °API | 39.8 |
| Flash C. O. C., °F | 215 |
| Fire, °F | 255 |
| Pour point, °F., fluid at _____ °F | −75 |
| S. U. vis. at 100° F., seconds | 50.1 |
| S. U. vis. at 130° F., seconds | 41.3 |
| Viscosity index | 0 |
| Viscosity gravity constant | 0.796 |
| Color, NPA | 1− |

The viscosity gravity relationship was first discussed by Hill and Coats in the Industrial and Engineering Chemistry, volume 20, June 1928, pages 641–644. A chart used for calculating the viscosity gravity constant is given in the Analytical Edition of this Journal, page 144, April 15, 1921.

The viscosity temperature relationship or viscosity index referred to in the above discussion has been described by Dean and Davis in Chemical and Metallurgical Engineering, volume 36, October 1929, pages 618–619.

The distillation bottoms had a clear light yellow color, mild odor, a very low pour point and, surprisingly, although this material had a very low viscosity gravity constant it also possessed a relatively low viscosity index. This material has been found to have very low swelling effects upon rubber as well as upon many types of synthetic rubbers now being employed in the construction of hydraulic systems.

Although this material has a low viscosity index it has been found that the addition of relatively small proportions of certain polymers and/or resins which are now sold on the market has the effect of greatly increasing the viscosity index of these isoparaffinic distillation bottoms. This increase in visocity index is far greater than that obtained when adding these same polymers and/or resins to ordinary paraffinic or naphthenic petroleum naphtha fractions. The polymers referred to above are those of the type produced by polymerizing low boiling olefins, particularly isobutene, in the presence of such catalytic materials as aluminum chloride, boron trifluoride or the like. These polymers, which will be referred to as butene polymers, have molecular weights in the order of 5,000 to 100,000 and even higher, and are described in Industrial and Engineering Chemistry, volume 32, page 299 (1940) by Thomas et al.

The resins referred to above, which may also be considered to be polymers, are those of the type obtainable by polymerizing acrylic acid esters or esters of substituted acrylic acids. Resins having the desired characteristics may be prepared by esterifying acrylic acid, acrylic acid homologues, or substituted acrylic acids with the normal or isomeric alcohols containing from about 4 to about 10 carbon atoms per molecule. A preferred resin is a polymerized acrylic acid ester currently obtainable from Röhm and Haas, Philadelphia under the name "Acryloid HF" in a thinned or otherwise reduced form containing 50% by weight of the resin in solution in a low viscosity mineral oil having a high viscosity index and a high aniline point. The polymerized ester herein contained is believed to be the polymerized normal octyl ester of acrylic acid.

These butene polymers and acrylic acid ester polymers or resins may be used separately or, preferably, relatively small proportions of the butene polymer and relatively larger proportions of the resin, say two to four times as much of the resin as of the butene polymer may be added to the isoparaffinic base material to produce a hydraulic fluid composition having particularly desirable viscosity temperature characteristics. Thus it is found that blends containing both the polymer and the resin show increases in viscosity index above those obtained using either of the additive materials by themselves.

The butene polymers when used alone or together with the acrylic acid ester resins or polymers may be used in amounts in the order of from 0.2 to 8.0% by weight of the total hydraulic fluid composition and the acrylic acid ester resins may be used in amounts in the order of from 0.5 to 10.0% in the production of desirable hydraulic fluids although I prefer to use between about 1.0% and about 5.0% by weight of the butene polymer and/or between about 3.0% and about 8.0% by weight of the acrylic acid ester.

Although blends consisting of high boiling isoparaffinic hydrocarbons, polymers and/or resins are relatively stable compositions it has been found that it is possible to improve the stability of these compositions by the addition of small proportions of stabilizing agents and/or antioxidants. Thus it has been found that the incorporation of hydroquinone in amounts in the order of 0.0008% by weight will greatly improve the stability of hydraulic fluids, such as those described above. Other additives which may be used to improve the stability of my composition of matter and which may be considered to be a part of said composition of matter include bromo-aminophenol; di-secondary butyl paraphenylene-diamine; the zinc salt of di(methylcyclohexyl) dithiophosphate; compounds of the class of compounds which may be described as alkaline earth metal salts of alkyl-hydroxylphenol thioethers and may be represented by the general formulas

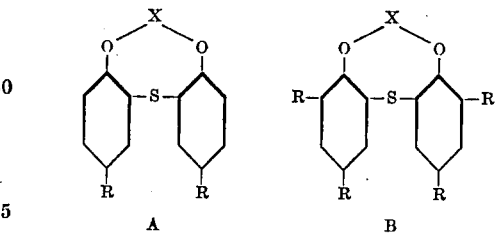

A        B where X is an alkaline earth metal, e. g., calcium, R is an alkyl or aryl radical, and S may represent either 1 or 2 sulfur atoms. A compound corresponding to general formula B is the calcium salt of tertiary-amyl-cresyl sulfide. These stabilizers and/or antioxidants may be used in proportions ranging from about 0.01% to about 2% by weight of the total hydraulic fluid composition.

Although I may use a bottoms fraction from a distillation of an alkylated product as the base material for my composition of matter, I prefer to use as a base stock a "heart cut" obtained by distilling the total alkylation product or a bottoms fraction of the alkylation product obtained after removing as a distillation overhead the lower boiling fractions which have value in the production of high octane motor fuels. The heart cut may have any desired boiling range between about 400–700° F. but will preferably have a boiling range falling between approximately 425° F. and 550° F.

The total alkylation bottoms fraction and/or heart cut may be treated with concentrated sulfuric acid and subsequently with caustic and/or clay or other adsorbent material or may be refined by other processes before adding the polymer and/or resin in the preparation of the hydraulic fluid.

In some instances it is desirable to include in the hydraulic fluid composition minor proportions, as for example 3–25% by weight of a relatively non-volatile oil having a higher boiling point range than the isoparaffinic base material. This oil serves to plasticize the resin and/or polymer particularly at points of leakage in hydraulic systems where it would otherwise be possible for the isoparaffin to evaporate and leave a viscous or resinous deposit and the amount of the high boiling oil to be used will depend upon the proportion of high molecular weight polymer in the hydraulic fluid composition. An oil having desirable characteristics for this purpose is a so-called neutral oil, a highly acid or solvent treated naphthenic type oil having a Saybolt Universal viscosity of about 97 seconds at 100° F., a pour point of about −45° F., a gravity of about 28.5° A. P. I., and an aniline point of about 178° F.

The high molecular weight butene polymer may be obtained in a substantially pure form and dissolved in the hydraulic fluid base oil or the substantially pure polymer may be first thinned with or dissolved in an essentially wax-free mineral oil, said mineral oil having desirably a relatively high viscosity index and aniline point and a Saybolt Universal viscosity at 100° F. in the order of from 70 to 110 seconds or even higher and the thinned polymer may be then added to and dissolved in the base oil. A commercially available product consisting of a butene polymer thinned with a mineral oil is one obtainable from Stanco Distributors, Inc., Bayway, N. J., under the name "Paratone." This product consists of 20% by weight of an isobutene polymer having a molecular weight in the order of 12,000 and 80% by weight of a highly solvent treated mineral oil having a viscosity index of about 115 and a gravity of about 32° A. P. I.

Thus a hydraulic fluid composition comprising a high boiling isoparaffinic hydrocarbon fraction, a high molecular weight butene polymer and a plasticizer may be produced by blending 95% by weight of an alkylation bottoms fraction with 5% by weight of Paratone as hereinbefore described. This product would consist of 95% by weight of high boiling isoparaffinic hydrocarbons, 1% by weight of a butene polymer and 4% by weight of a mineral oil which would act as a plasticizer for the high molecular weight polymer.

The following examples of hydraulic oils included within the scope of my invention will serve to further illustrate the invention but are not to be taken as limiting in any way the scope of the invention:

*Example I*

To a portion of alkylation bottoms having a viscosity of 42.1 seconds Saybolt Universal at 100° F. was added 0.5% by weight of a butene polymer having a molecular weight of approximately 12,000. To a second portion of the same base stock was added 1.0% by weight of the polymer. The characteristics of the alkylation bottoms stock and of each of the two blends are shown in the following tabulation.

| | S. U. vis. at 100° F., seconds | S. U. vis. at 130° F., seconds | S. U. vis. at 210° F., seconds | Viscosity index |
|---|---|---|---|---|
| Original stock | 42.1 | 37.0 | Approx. 31 | About 0 |
| +0.5% polymer (mol. wt. 12,000) | 47.1 | 40.0 | Approx. 32.7 | About 55 |
| +1.0% polymer (mol. wt. 12,000) | 53.0 | 43.4 | 34.2 | About 110 |

It will be noted that the original stock had a viscosity index of about 0 whereas that of the stock containing about 0.5% of the polymer was in the order of 55 and the stock containing 1.0% of the polymer had a viscosity index of approximately 110.

*Example II*

To a portion of alkylation bottoms having a Saybolt Universal viscosity of 42.1 seconds at 100° F. was added 0.5% of a butene polymer having a molecular weight of approximately 100,000 and to a second portion of the same base stock was added 1.0% by weight of the same polymer. From the data shown in the following tabulation it will be seen that the addition of 0.5% increased the viscosity index of the base stock from 0 to about 150 and the addition of 1.0% by weight of the polymer increased the viscosity index to about 210:

| | S. U. vis. at 100° F., seconds | S. U. vis. at 130° F., seconds | S. U. vis. at 210° F., seconds | Viscosity index |
|---|---|---|---|---|
| Original stock | 42.1 | 37.0 | Approx. 31 | About 0 |
| +0.5% polymer (mol. wt. 100,000) | 49.0 | 42.0 | 34.3 | About 150 |
| +1.0% polymer (mol. wt. 100,000) | 74.9 | 57.3 | 40.4 | About 210 |

*Example III*

A portion of alkylation bottoms was distilled and that portion boiling between about 440 and 488° F. was selected as the base stock for the preparation of a hydraulic fluid. This fraction or heart cut of the alkylation bottoms was treated with 30 pounds per barrel of 98% $H_2SO_4$ at about room temperature. After settling and withdrawal of the sludge the hydrocarbon phase was washed with water, dilute caustic solution, and finally with water. The acid treated, water washed heart cut was then mixed with 8% by weight of a lubricating oil treating clay and 0.3% by weight of 50° Bé. caustic (approximately 50% by weight NaOH) and heated while mixing to a temperature of about 300° F. The hot mixture was filtered through a Büchner funnel which had been precoated with a small amount of a lubricating oil treating clay. The treated heart cut was then used in the preparation of two hydraulic fluids, A and B.

Hydraulic fluid A was prepared by blending 68.5% by weight of the treated heart cut, 13.5% by weight of Acryloid HF as hereinbefore described and 18.0% by weight of neutral oil. The neutral oil was a highly treated naphthenic type oil having a Saybolt Universal viscosity at 100° F. of 97 seconds, a pour point of —45° F. and a gravity of 28.5° A. P. I.

Hydraulic fluid B was prepared by blending 70.6% by weight of the treated heart cut, 10.0% by weight of Acryloid HF, as hereinbefore described, 1.4% by weight of the butene polymer (molecular weight approximately 12,000) and 18.0% by weight of neutral oil.

The characteristics of the treated heart cut and of hydraulic fluids A and B prepared therefrom are as follows:

|  | Treated alkylation heart cut | Hydraulic fluid A | Hydraulic fluid B |
| --- | --- | --- | --- |
| S. U. vis. at 100° F., sec | 35.7 | 75.7 | 74.7. |
| S. U. vis. at 130° F., sec | 33.1 | 60.2 | 59.3. |
| S. U. vis. at 210° F., sec |  | 43.3 | 42.5. |
| Viscosity index |  | 215 | 218. |
| Pour point, ° F | Flows at −80. | Flows at −80. | Flows at −80. |
| Gravity, ° API | 44.9 | 38.8 | 39.4. |
| Viscosity gravity constant |  | 0.786 | 0.783. |

In the foregoing description and examples and in the following claims the term hydraulic fluid is meant to include not only those fluids which are used in hydraulic systems of any and all types but also those fluids which desirably have high viscosity indices, low pour points, low viscosity gravity constants and are relatively stable and which may be used in mechanical systems or devices wherein a fluid is used as a means of transmitting power or in recoil mechanisms where the fluid is used as a spring or damp as, for example, a recoil fluid to retard the backward thrust of a gun.

Similarly, by the term acrylic acid ester is meant the esters which may be produced by reacting acrylic acid or substituted acrylic acids in which the substituent or substituents may be alkyl or aryl radicals, with normal or isomeric alcohols having in the order of from 4 to 10 carbon atoms in their molecules.

While the character of the invention has been described in detail and numerous examples of the composition given, this has been done by way of illustration only and with the intention that no limitation should be imposed on the invention thereby. It will be apparent to those skilled in the art that numerous modifications may be made without departing from the scope of the following claims.

This application is a continuation-in-part of application Serial No. 411,903 filed September 22, 1941, for Composition of matter.

I claim:

1. A composition of matter usable as a hydraulic fluid comprising a major proportion of high boiling isoparaffinic hydrocarbons boiling between about 400 and 700° F. blended with a relatively small amount sufficient to change the viscosity index thereof substantially, of a polymer of a low boiling olefin said polymer having a molecular weight above about 5000 and a polymerized acrylic acid ester of a saturated alcohol.

2. A composition of matter usable as a hydraulic fluid comprising a major proportion of high boiling isoparaffinic hydrocarbons produced by reacting an olefin with a low boiling isoparaffin in the presence of a catalyst blended with a relatively small amount sufficient to change the viscosity index thereof substantially, of a polymer of a low boiling olefin said polymer having a molecular weight above about 5000 and a polymerized acrylic acid ester of a saturated alcohol.

3. A composition of matter usable as a hydraulic fluid comprising a major proportion of high boiling isoparaffinic hydrocarbons produced by reacting an olefin with a low boiling isoparaffin blended with a relatively small amount sufficient to change the viscosity index thereof substantially, of a polymer of a low boiling olefin said polymer having a molecular weight above about 5000 and a polymerized acrylic acid ester of a saturated alcohol and a minor proportion of a higher boiling mineral oil having a relatively high viscosity index and a relatively high aniline point.

4. A composition of matter usable as a hydraulic fluid comprising a major proportion of high boiling isoparaffinic hydrocarbons produced by reacting an olefin with a low boiling isoparaffin blended with from 0.2 to 8% by weight of a polymer of a low boiling olefin said polymer having a molecular weight above about 5000 and a small amount of a polymerized acrylic acid ester of a saturated alcohol.

5. A composition of matter usable as a hydraulic fluid comprising a major proportion of high boiling isoparaffinic hydrocarbons produced by reacting an olefin with a low boiling isoparaffin blended with from 0.2 to 8% by weight of a polymer of a low boiling olefin said polymer having a molecular weight from 5,000 to 100,000 and 0.5–10% by weight of a polymerized acrylic acid ester of a saturated alcohol and a minor proportion of a neutral mineral oil having a relatively high viscosity index and a relatively high aniline point.

6. A composition of matter usable as a hydraulic fluid comprising a major proportion of high boiling isoparaffinic hydrocarbons produced by reaction of an olefin with a low boiling isoparaffin blended with a relatively small amount of a polymerized acrylic acid ester of a saturated alcohol.

7. A composition of matter usable as a hydraulic fluid comprising a major proportion of high boiling isoparaffinic hydrocarbons produced by reacting an olefin with a low boiling isoparaffin blended with from 0.5 to 10% by weight of a polymerized acrylic acid ester of a saturated alcohol and a minor proportion of a low viscosity neutral naphthenic type mineral oil.

8. A composition of matter usable as a hydraulic fluid comprising a major proportion of high boiling isoparaffinic hydrocarbons produced by reaction of an olefin with a low boiling isoparaffin blended with a relatively small proportion sufficient to change the viscosity index thereof substantially, of a polymer of a low boiling olefin said polymer having a molecular weight above about 5000 and a relatively larger proportion of a polymerized acrylic acid ester of a saturated alcohol.

9. A composition of matter usable as a hydraulic fluid comprising a major proportion of high boiling isoparaffinic hydrocarbons produced by reacting an olefin with a low boiling isoparaffin blended with from 0.2 to 8% by weight of a butene polymer having a molecular weight from 5,000 to 100,000 and with from 0.5 to 10% by weight of a polymerized acrylic acid ester of a saturated alcohol and a minor proportion of a neutral mineral oil having a relatively high viscosity index and a relatively high aniline point.

10. A composition of matter usable as a hydraulic fluid comprising a major proportion of a hydrocarbon fraction produced by the alkylation of an isoparaffin with an olefin and having a boiling range within the limits 400° F. to 700° F. blended with a relatively small amount sufficient to change the viscosity index thereof substantially, of a polymer of a low boiling olefin said polymer having a molecular weight above about 5000 and a polymerized acrylic acid ester of a saturated alcohol and a relatively larger amount of a mineral oil plasticizing agent.

11. A composition of matter usable as a hydraulic fluid comprising a major proportion of an isoparaffinic hydrocarbon fraction produced by the alkylation of an isoparaffin with an olefin and having a boiling range from 425° F. to 550° F. blended with a relatively small proportion sufficient to change the viscosity index thereof substantially, of a polymer of a low boiling olefin said polymer having a molecular weight above about 5000 and a relatively larger proportion of a polymerized acrylic acid ester of a saturated alcohol.

12. A composition of matter usable as a hydraulic fluid comprising a major proportion of an isoparaffinic hydrocarbon fraction produced by the alkylation of an isoparaffin with an olefin and having a boiling range from 425° F. to 550° F., said fraction being treated with concentrated sulfuric acid and with clay, blended with from 1.0 to 5% by weight of an isobutene polymer having a molecular weight of about 12,000 and with from 3 to 8% by weight of a polymerized acrylic acid ester of a saturated alcohol and a minor proportion of a neutral mineral oil having a relatively high viscosity index and a relatively high aniline point and a Saybolt Universal viscosity at 100° F. of from 90 to 110 seconds.

13. A composition of matter usable as a hydraulic fluid comprising a major proportion of an isoparaffinic hydrocarbon base oil produced by the alkylation of an isoparaffin with an olefin and having a boiling range from 440° F. to 488° F., said isoparaffinic hydrocarbon base oil being treated with concentrated sulfuric acid and subsequently with clay in the presence of a relatively small amount of concentrated caustic solution blended with about 1.4% by weight of a polymerized isobutene having a molecular weight of about 12,000 and with about 5% by weight of a polymerized acrylic acid ester of a saturated alcohol, said polymerized ester being thinned with an equal weight of a low viscosity oil similar in characteristics to the isoparaffinic hydrocarbon base oil and a minor proportion of a higher boiling, neutral mineral oil having a viscosity of about 97 seconds Saybolt Universal at 100° F., a pour point of about −45° F. and an aniline point of about 178° F.

14. A composition of matter usable as a hydraulic fluid comprising from 75 to 97% by weight of a high boiling isoparaffinic hydrocarbon produced by reaction of an olefin with a low boiling isoparaffin blended with a relatively small proportion sufficient to change the viscosity index thereof substantially, of a polymer of a low boiling olefin said polymer having a molecular weight above about 5000 and a polymerized acrylic acid ester of a saturated alcohol and correspondingly from 25 to 3% by weight of a neutral naphthenic type mineral oil having a Saybolt Universal viscosity of about 97 seconds at 100° F., a pour point of about −45° F., a gravity of about 28.5° A. P. I. and an aniline point of about 178° F. and stabilized by the incorporation of relatively small amounts of a stabilizing agent.

15. A composition as set forth in claim 6, in which the isoparaffinic hydrocarbons boil between 400 and 700° F. and the ester is from an alcohol having from 4 to 10 carbon atoms in the molecule.

16. A composition as set forth in claim 6, in which the ester is from an alcohol having from 4 to 10 carbon atoms in its molecule.

17. A composition as set forth in claim 7, in which the ester is from an alcohol having from 4 to 10 carbon atoms in its molecule.

18. A composition as set forth in claim 1, in which the isoparaffinic hydrocarbons boil between 400 and 700° F. and in which the polymer is a polymerized acrylic acid ester from an alcohol having from 4 to 10 carbon atoms in its molecule, the polymer being used in an amount of from 0.5 to 10% by weight of the composition.

19. A composition of matter usable as a hydraulic fluid comprising a major proportion of high boiling isoparaffinic hydrocarbons produced by reacting an olefin with a low boiling isoparaffin blended with from 0.2 to 8% by weight of a butene polymer having a molecular weight from 5,000 to 100,000 and with from 0.5 to 10% by weight of a polymerized acrylic acid ester of a saturated alcohol.

20. A composition of matter usable as a hydraulic fluid comprising a major proportion of an isoparaffinic hydrocarbon fraction produced by the alkylation of an isoparaffin with an olefin and having a boiling range from 425° F. to 550° F., said fraction being treated with concentrated sulfuric acid and with clay, blended with from 1.0 to 5% by weight of an isobutene polymer having a molecular weight of about 12,000 and with from 3 to 8% by weight of a polymerized acrylic acid ester of a saturated alcohol.

21. A composition of matter usable as a hydraulic fluid comprising a major proportion of an isoparaffinic hydrocarbon base oil produced by the alkylation of an isoparaffin with an olefin and having a boiling range from 440° F. to 488° F. said isoparaffinic hydrocarbon base oil being treated with concentrated sulfuric acid and subsequently with clay in the presence of a relatively small amount of concentrated caustic solution, blended with about 1.4% by weight of a polymerized isobutene having a molecular weight of about 12,000 and with about 5% by weight of a polymerized acrylic acid ester of a saturated alcohol.

MYRON H. KOLLEN.

Disclaimer 2,408,983.—*Myron H. Kollen*, Detroit, Mich. COMPOSITION OF MATTER SUITABLE AS A HYDRAULIC FLUID. Patent dated Oct. 8, 1946. Disclaimer filed Mar. 24, 1950, by the assignee, *Union Oil Company of California.*

Hereby enters this disclaimer to claim 1 of said patent.

[*Official Gazette May 9, 1950.*]